July 11, 1950 H. S. HELLER ET AL 2,514,578

SOUND RECORDING AND REPRODUCTION SYSTEM

Original Filed Feb. 23, 1946 2 Sheets-Sheet 1

HERMAN S. HELLER,
WILLARD E. STOFER,
INVENTORS.

BY Forrest A. Lilly

ATTORNEY.

HERMAN S. HELLER,
WILLARD E. STOFER,
INVENTORS.

BY [signature]
ATTORNEY.

Patented July 11, 1950 2,514,578

UNITED STATES PATENT OFFICE

2,514,578

SOUND RECORDING AND REPRODUCTION SYSTEM

Herman S. Heller, West Los Angeles, and Willard E. Stofer, North Hollywood, Calif.; said Stofer assignor to said Heller

Original application February 23, 1946, Serial No. 649,594. Divided and this application March 25, 1948, Serial No. 17,048

5 Claims. (Cl. 179—100.2)

This invention relates generally to the art of sound recording and reproduction, and more particularly to magnetic sound recording and reproduction of the multiple lane class, wherein a multiplicity of recordations are made side by side on a record tape. The invention will be particularly described with magnetic recording in view, though it will be understood as broadly applicable to multiple lane recording on any tape type of record medium.

This application is a division of my parent application entitled Sound recording and reproducing system, Serial No. 649,594, filed February 23, 1946.

Multiple lane sound recording has a distinct advantage for many applications in that for a given recording time, the necessary length of the tape is decreased a number of times equal to the number of lanes used. Assuming eight record lanes, the saving is evidently quite substantial. As a corollary advantage, the operator can always return or back track to any portion of the recording by running the tape a distance which will never exceed a certain sub-multiple (e. g., one-eighth) of the length of tape that would be used in single lane recording.

However, even with the above mentioned advantages of multiple lane recording as now known, the time required to back track, i. e., run the tape in reverse to the starting point, or some selected passage, is a disadvantage under some conditions.

An object of the present invention is accordingly to provide a sound recording and reproduction system of the multiple lane record tape class wherein complete recordations of predetermined time duration may be made on the several lanes of the tape within pre-selected longitudinal subdivisions or "blocks" of the full tape length. It will be evident that the end limits of each such "block" may be much closer together than the end limits of the tape as a whole, and that the time for back tracking within such a block, or rewinding from one end limit to the other, may be very materially reduced, thus at once greatly mitigating one of few remaining disadvantages of tape recording.

A still further object is the provision of means by which a recording of any predetermined time duration may be recorded on an even number of successive record lanes within a pre-selected "block," and will be completed with the tape returned to its starting position, whereby reproduction of the recording so made may commence without back tracking or rewinding—in brief, with no waiting period whatsoever.

A further object of the invention is to provide means whereby the time duration of the block may be set as desired, and which, when properly set, will reverse the tape at the two end limits of the block so that recording or reproduction is confined therewithin.

A particular feature of the invention is the provision on the record tape, along side the several recording lanes, of a control lane on which is recorded signals capable in conjunction with associated apparatus of reversing the direction of the tape at any predetermined time or tape position. The recorded signals may be used at the beginning and ending of each block. Additionally, similar signals are preferably utilized at the two ends of the tape for automatic reversal of the direction of the tape and transference of record drive from one lane to the next. This provision safeguards against running the ends of the tape off the reels, and is particularly desirable when the block system is not in use, as well as when operations are "outside" the end limits of any "blocks" which have been established.

The invention, including various additional objects and features, will be best understood without further preliminary discussion by referring now to the following detailed description of one present illustrative embodiment thereof, reference being had to the accompanying drawings, wherein.

There are two known methods or systems of multiple lane recording either one of which is applicable to the present invention. The first, disclosed in prior Patent No. 2,213,631, to Herman S. Heller, et al., involves the use of a multiplicity of translating magnets distributed transversely across the tape, and switched successively into operation as the tape is driven first in one direction and then the other. The present invention will be hereinafter described in connection with this first-mentioned system. A second system employs translating magnets which are shifted transversely of the tape into successive cooperative relation with the several recording lanes thereof as the tape is driven in first one direction and then the other. See Patent No' 2,275,961 to Herman S. Heller, and also application Serial No. 608,734, now Patent No. 2,468,198, granted April 26, 1949, to Herman S. Heller. It will be entirely within the skill of those versed in the art to adapt the present invention to this second system of multiple lane recording, and no specific illustration thereof is deemed necessary herein, it being sufficient to note that both systems are in contemplation and are included within the scope of the appended claims.

Figures 2, 3, 4, 5, 6, 7:
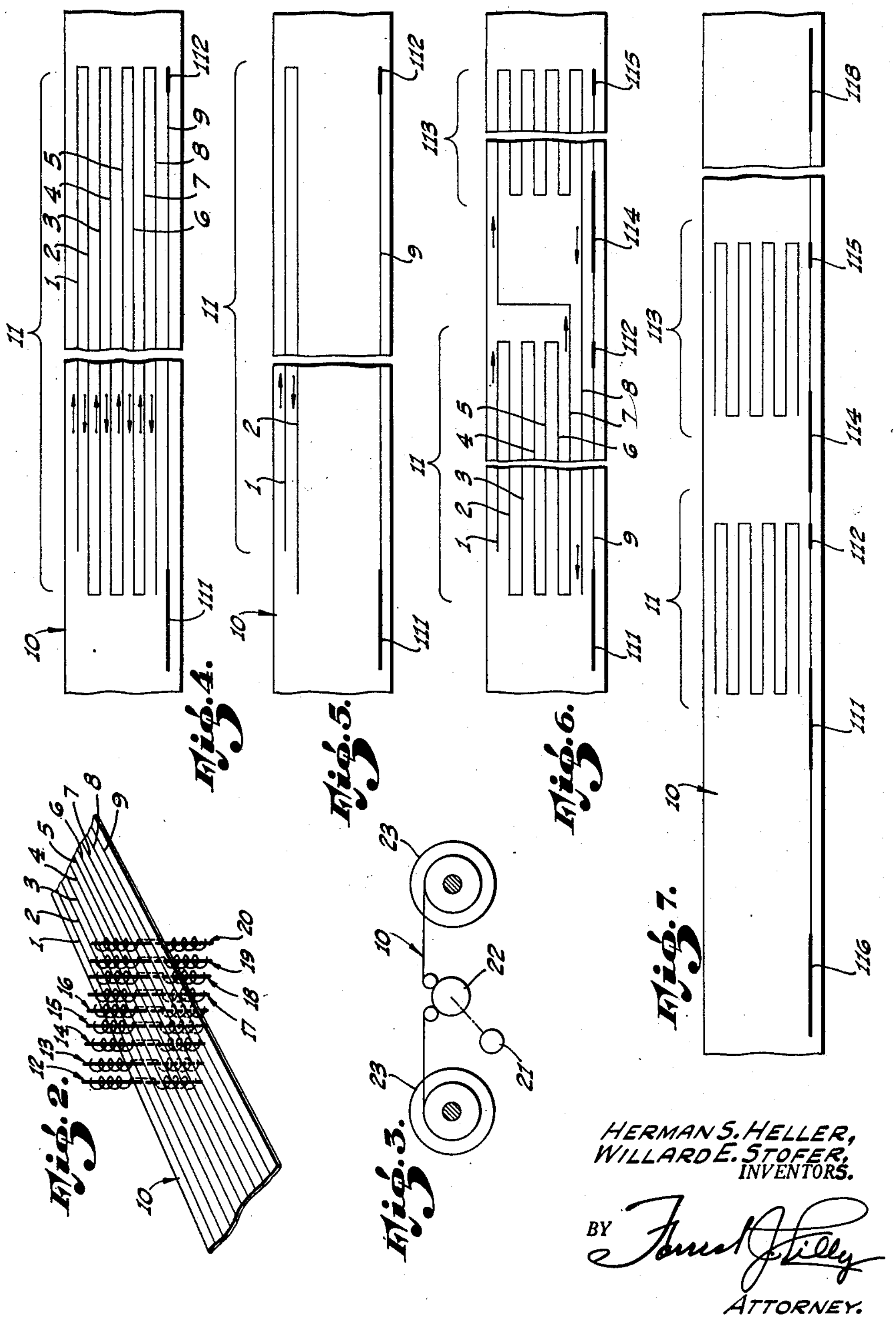
Figure 2 is a diagrammatic perspective of a section of record tape and showing diagrammatically the cooperation therewith of the translating and control signal electromagnets.
Figure 3 is a diagram indicating the drive means for the tape.
Figures 4, 5, 6 and 7 are diagrammatic views of sections of record tape indicating various illustrative types of block recordings within the scope of the invention.

Reference is first directed to Figure 4 of the drawings, showing diagrammatically, and not to scale, a section of record tape on which a block recording in accordance with the invention may be made. It will of course be understood that in practice the tape may be of a width of the order of ¼'' to $\frac{5}{16}$'', the present illustration being considerably exaggerated and being entirely diagrammatic in nature. The successive longitudinal lines 1 to 8 represent successively used, transversely spaced recording lanes, and the short transverse lines connecting the longitudinal lines represent merely the shifts from the terminal ends of the several recording lanes to the beginning ends of the next succeeding lanes. These shifts might constitute actual transverse movements of the translating magnets, or, as in the particular illustration herein set forth, electrical shifts between magnets permanently alined with the respective lanes. The arrows represent the directions in which the records are made on the several lanes, and are of course directed oppositely to the direction of tape travel in each instance. Referring still to Figure 4, it will be observed that there is a ninth lane 9 between the eighth recording lane 8 and the edge of the tape, and it is to be understood that a separate magnet or pair of magnets is alined with said lane 9 and is adapted to record thereon certain signals utilized to perform a later described control function. The tape is designated generally in the figure by the numeral 10, and the numeral 11 and bracket designate a complete "block" recording.

Figure 2 shows diagrammatically, again with great width exaggeration, a section of tape 10 and a plurality of pairs of translating electromagnets 12 to 19 spaced transversely thereacross, so as to cooperate with the several record lanes 1 to 8, respectively, and an additional pair of electromagnets 20 positioned between said record lanes and one edge of the tape and adapted to cooperate with the control-signal lane 9. Each such pair will be understood to consist of a pair of thin steel cores contacting opposite faces of the tape, of widths equal to the desired widths of the record or signal lanes, and having the usual coils or windings.

For space accommodation, these magnets are in practice also somewhat staggered or spaced along the length of the tape, in any suitable arrangement. The arrangement is of course made as compact as possible. From a theoretical standpoint, such stagger may be disregarded, and Figure 4 and similar diagrams are made without taking it into account.

In Figure 3 is indicated diagramamtically a typical drive system for the tape 10, including a reversible drive motor 21, drive roll 22 in peripheral engagement with the tape, and suitable reels 23 which will be understood to be operated in the conventional manner.

Figure 1:
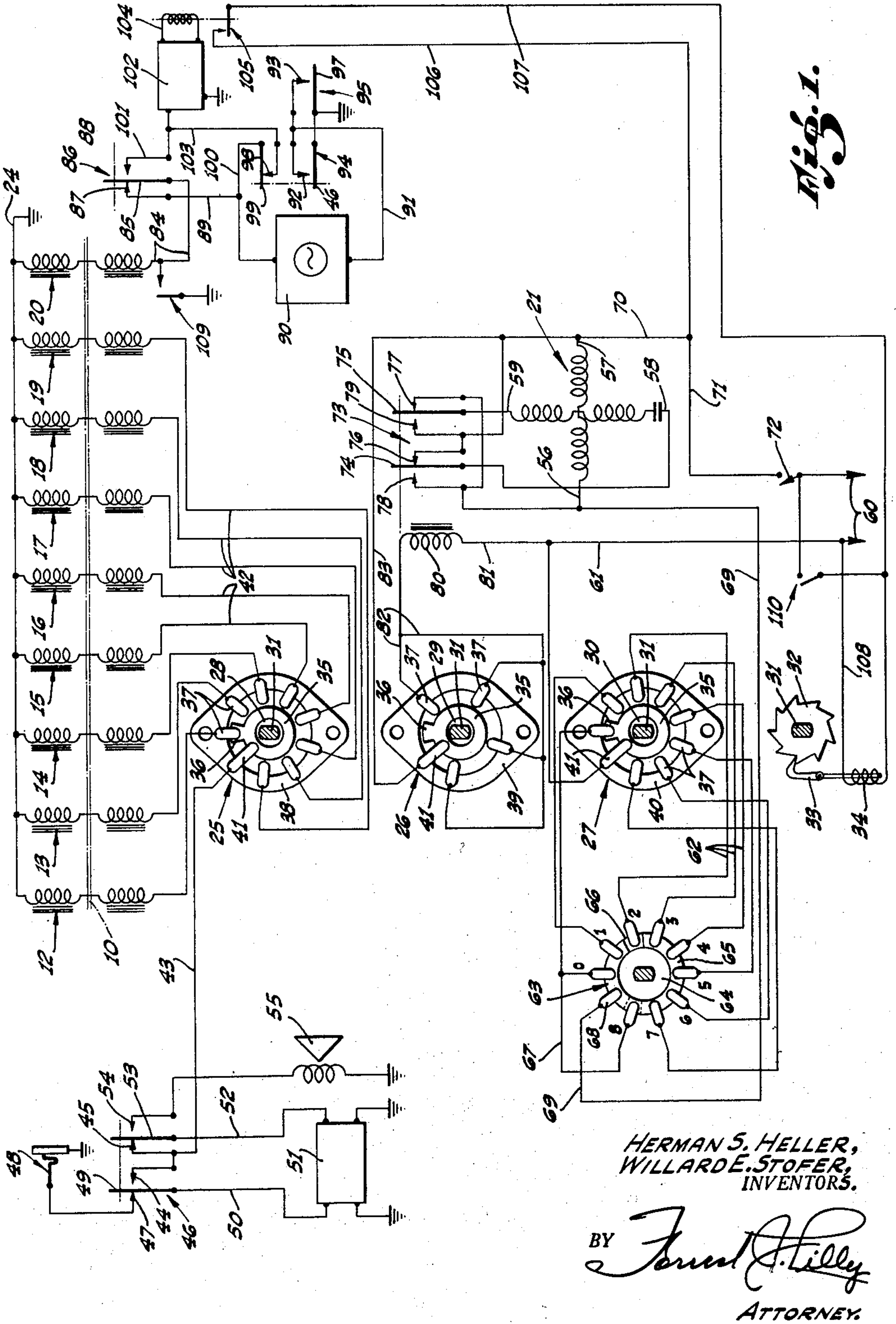
Figure 1 is a schematic circuit diagram of one illustrative embodiment of the invention.

Reference is now directed to Figure 1, showing schematically a complete illustrative block recording system in accordance with the invention. The several pairs of translating electromagnets are again designated by numerals 12 to 19, and the control signal electromagnets by numeral 20, the tape passing therebetween being indicated at 10. Corresponding sides of the several electromagnets are connected to a common ground lead 24.

Three decks 25, 26 and 27 of a conventional type of rotary, multiple-contact switch have insulation rotors 28, 29 and 30, respectively, mounted tightly on a common operating shaft 31 with a ratchet wheel 32 which is operated step-by-step by a quick acting pawl 33 connected to the plunger of a solenoid 34. It is necessary that this ratchet mechanism be of a quick acting type, capable of stepping the switch ahead in a small fraction of a second. We have merely indicated such a mechanism in a diagrammatic way, since suitable mechanisms are well known to those skilled in the art. Each switch rotor carries a collector ring 35 having a radially projecting contact or brush 36. This brush 36 is in each instance adapted to sweep successively over switch contacts 37 carried by an insulation stator, indicated at 38 for deck 25, at 39 for deck 26, and at 40 for deck 27. In the present instance, the decks 25 and 27 have eight of such contacts spaced 40° apart, and in the otherwise un-used ninth position are longer contacts or brushes 41 bearing constantly on the collector ring 35, while the deck 26 has four of such contacts spaced 80° apart, corresponding with the second, fourth, sixth and eighth contacts of the decks 25 and 27, and has also a longer contact or brush 41 bearing on the collector ring in the otherwise unused ninth position. For a nine position switch, the ratchet wheel 32 has nine teeth, and each actuation thereof moves the rotor contacts through 40° of rotation, from one stator contact to the next.

The ungrounded sides of the several translating magnets are connected by leads 42 to the eight stator contacts 37 of switch deck 25, and the ninth stator contact or brush is connected by lead 43 to the contacts 44 and 45 of a gang switch 46. Opposed to switch contact 44 is a switch contact 47 connected to microphone jack 48, a switch arm 49 being movable to make with either contact 44 or contact 47. Switch arm 49 is connected by lead 50 to one input terminal of amplifier 51. The ungrounded output terminal of amplifier 51 is connected by lead 52 to movable switch arm 53 adapted to make alternately with contact 45 and with a switch contact 54 opposed to the latter, and said contact 54 is connected to speaker 55 as indicated. It will be understood that switch arms 49 and 53 are interconnected so as to move together, being in contact with contacts 47 and 45, respectively, for the "record" position, and with contacts 44 and 54, respectively, for "reproduce." In the "record" position, the microphone, not shown, is connected to microphone jack 48, and a circuit is formed including switch contact 47, switch arm 49, and lead 50 to the input end of the amplifier, and from the output of the amplifier by lead 52, switch arm 53 and contact 45, and lead 43 to switch brush 41. From switch brush 41, the circuit continues via collector ring 35, brush 36, one of the contacts 37, and the corresponding lead 42 to a pair of translating magnets, depending of course upon the position of the rotor of switch deck 25. The magnets are accordingly in circuit with the amplifier, and the machine is in condition for recordation. In the "reproduce" position, one of the pairs of translating magnets, as 12, depending upon the position of switch rotor 28, forms a circuit via its lead 42, switch contact 37, brush 36 and the collector ring to brush 41, and from there via lead 43 to switch contact 44, contact arm 49, and lead 50 to the input end of the amplifier, and from the output end of the amplifier via lead 52, contact arm 53 and contact 54 to speaker 55. Thus a pair of translating magnets, depending upon the position of the rotor of the switch deck 25, is in circuit with the speaker.

The reversible drive motor 21 for the machine is indicated in Figure 4 as of a split phase capacitor type, having four external leads 56, 57, 58 and 59, two for each phase.

Numeral 60 designates the terminals of a source of alternating current power, and one of said terminals is connected by circuit lead 61 to the stator brush 41 of switch deck 27. Brush 41 bears on the collector ring 35 of rotor 30, and the brush 36 carried by ring 35 sweeps successively over switch contacts 37, as already described. The contacts 37 are connected in order by leads 62 to respective stationary contacts 0—8 of a stop selector switch 63, said switch having a manually operable insulation rotor 64 provided with a collector ring 65 formed with a gap 66, the collector ring being adapted to sweep the contacts 0—8, and the gap 66 being adapted to cut any selected contact out of circuit. A conductor 67 connects the two contacts 0 and 8. As will become evident hereinafter, this switch 63 may be set to open the circuit of the drive motor in any selected position of the deck switches.

A brush 68 bearing on collector ring 65 between contacts 0 and 8 is connected by conductor 69 to one external lead 56 of one phase of motor 21, the other external lead 57 of the same phase of said motor being connected by leads 70 and 71 to the other terminal 60 of the source of power, a motor switch 72 being included in circuit as indicated.

The other phase leads 58 and 59 of the motor are arranged for connection through a motor reversing relay 73 across the power circuit, said switch being adapted when actuated to reverse the polarity of one phase of the motor with respect to the other whereby a reversal of the direction of rotation is obtained. Thus the phase leads 58 and 59 are connected to the two movable switch arms 74 and 75 of reversing switch 73, it being understood that said two switch arms are interconnected to move together. In the position shown, the arms 74 and 75 are in contact with switch contacts 76 and 77, respectively, the former being connected to one power lead 70, 71, and the latter being connected to the opposite power lead 69. The motor is therefore connected for rotation in one direction. For the reverse direction of rotation, switch arms 74 and 75 are shifted into contact with switch contacts 78 and 79, respectively, of which the former is connected to power lead 69, and the latter is connected to power lead 70, 71. It will be evident that the leads 58 and 59 of the one phase of the motor have been reversed with respect to the power leads, so that the motor will now rotate in the reverse direction.

The described motor reverse switch 73 is automatically operated by a magnet 80 under control of switch deck 26. This switch 73 is of a type to stand normally in the position shown in Figure 4, and to move over to the alternate position upon energization of the magnet 80. Magnet 80 is connected at one end by means of lead 81 to power lead 61, and at the other end by means of branching conductors 82 to the several stationary contacts 37 of switch deck 26. The brush 45 of deck 26 is connected by a lead 83 to power lead 70.

It will be evident that with the rotor of switch deck 26 in the position shown in Figure 1, the rotor contact 36 will be in the first position, and will not be in contact with any of the contacts 37, so that electromagnet 80 is deenergized, and motor reverse switch 73 is in the position illustrated. Upon energization of solenoid 34, however, ratchet wheel 32 will be advanced by one step, as will the rotor contacts 36 of the several switch decks, and the rotor contact 36 of deck 26 will then make with the first of the contacts 37 of the deck 26. Electromagnet 80, one side of which is permanently connected to one side of the source of current, thereupon has its other side connected through contacts 37 and 36, brush 41 and lead 83 to the other side of the source of power. Electromagnet 80 is thus energized, and moves the switch 73 to the alternate position thereby reversing the direction of drive motor 21. It will be evident that the contacts 37 for the switch deck 26, being spaced 80° apart, complete a circuit for the electromagnet 80 only in alternate positions of the ratchet wheel 32 and switch rotor, so that in the first, third, fifth, etc., positions, the electromagnet 80 is deenergized and the motor drives in one direction while in the second, fourth, etc., positions the electromagnet 80 is energized, and the motor drives in the reverse direction, The subject matter of Figure 1 as so far described with the exception of the control signal magnets 20 and the selector switch 63 is more or less disclosed in the aforementioned patents and applications. Thus, the system as so far described, provides a means whereby, upon closure of motor switch 72, the magnetic tape 10 will be driven by the motor 21 in one direction, and with the assumption that the switch decks 25 and 26 are in the condition shown in Figure 1, the first pair of translating magnets 12 will be in active circuit, capable of making a recording on the first line of the tape. If now the solenoid 34 be energized, in a manner subsequently to be described, the ratchet wheel 32 will be moved ahead one step, moving with it the rotors of the several switch decks. In the new position of switch deck 25, first lane translating magnets 12 will be cut out of circuit and second lane translating magnets 13 switched into circuit to make a recording on lane 2. At the same time, switch deck 26, in its new position, effects energization of electromagnet 80, and therefore operation of switch 73 to reverse the direction of the tape drive motor 21, so that the record tape will then travel in the reverse direction. Hence, a record having been made on lane 1 with one direction of tape travel, a second record, or a continuation of the first, may now be made on lane 2 with the tape traveling in the reverse direction. As already stated, the above functions have been accomplished in the recording systems disclosed in the aforementioned patents and applications. Figure 1 also shows electric circuit means whereby the "block" recording system of the present invention may be accomplished, and this circuit means will next be described.

The aforementioned control signal electromagnets 20 are connected by lead 84 to the movable arm 85 of a "record-reproduce" switch 86, which arm is adapted to be moved to make with a contact 87 for recording purposes, and with a contact 88 for reproducing purposes. Contact 87 is connected by lead 89 to one output terminal of a signal oscillator or generator 90, having a frequency of for instance 1000 cycles. The other output terminal of oscillator 90 is connected by lead 91 to the respective normally open stationary contacts 92 and 93 of two manual switches 94 and 95. The movable arms 96 and 97 of these switches, cooperable with the contacts 92 and 93, are grounded. Closure of either of these switches will connect oscillator 90 in circuit with translating magnets 20, and therefore accomplish a 1000 cycle recording on the ninth or control signal lane of the tape. Switch 94 is a gang type, including also stationary contact 98 and movable switch arm 99, movable with arm 96, and normally making with contact 98, but separating therefrom as the two arms 96 and 99 are moved to the alternate position. Switch arm 99 is connected to lead 89 by a lead 100, as indicated.

The contact 88 of switch 86 is connected by lead 101 to one input terminal of signal amplifier 102, and the stationary contact 98 of switch 94 is connected by lead 103 and the lead 101 to the same amplifier input terminal.

The output terminals of amplifier 122 are connected to a relay coil 104 which, when energized, closes a normally open switch 105. Connected to one side of the switch 105 is a lead 106 joining with one power lead 71, and connected to the other side of the switch 105 is a lead 107 connected to one side of the electromagnet 34, the other side of which is connected by lead 108 to the other power lead 61.

A normally open manual switch 109 is connected between the ungrounded end of translating magnets 20 and ground.

A normally open lane selector switch 110 is connected between lead 107 and lead 71, "outside" of motor switch 72, whereby the stepping solenoid 34 can be energized under manual control, even though the motor switch 72 be open.

The operation of the system will next be described. It will be assumed, as a first example, that it is desired to make a 15 minutes "block" recording on lanes 1 and 2 of the tape, starting at the beginning point of lane 1, and ending at the end point of lane 2, opposite the beginning point of lane 1, as indicated in Figure 5. It is assumed that the tape will travel from right to left during the recording on lane 1, and from left to right during the recording one lane 2. The small arrows in Figure 5 indicate the directions in which the recordings will progress along the record lanes. The record having been made as proposed on lanes 1 and 2, then by simply shifting back to lane 1, reproduction may be begun immediately. This is of interest, for instance, where it is desired to make a recording of a radio program, and to play the recording back the instant it has been completed. Accordingly, assume all of the switches to be in the position of Figure 1 (note that selector switch 63 is in position "2," denoting that the recording will terminate at the end of record lane 2) and assume further that the total recording time is to be of 15 minutes' duration, as in the case of a 15 minute radio program. First lane translating magnets 12 are in circuit through switch deck 25 with the microphone plugged into jack 48, in condition for a recording to be made on lane No. 1.

The machine is preferably started a second or so before the recording is to begin. At the proper time, motor switch 72 is closed, energizing and starting the tape drive motor 21. The moment the tape begins to travel, manual switch 94 is moved from the position shown in Figure 1 to the alternate position. Switch arm 96 making with contact 92, a circuit is formed whereby oscillator 90 feeds control signal magnets 20, and a 1000 cycle note is recorded on the control signal lane 9 of the tape. The switch 94 is held in this position for approximately a second, whereby, with a typical tape speed of 60 feet per minute, a one thousand cycle control signal of approximately one foot in length is recorded on the control lane. This control signal is designated generally by the numeral 111 in Figure 5, though with considerable contraction owing to space limitations. The described operation of switch 94 has also temporarily broken the connection between oscillator 90 and amplifier 102, the reason for which will presently become clear.

Operations are preferably so timed that the control signal 111 has been recorded by the time the recording is started on lane 1. Seven and one-half minutes following the beginning of the predetermined recording period, the manual switch 95 is closed setting into operation a train of events as follows: oscillator 90 is again in closed circuit with electromagnets 20, and another control signal 112 of 1000 cycles is recorded on the control signal lane 9 of the tape. Furthermore, the oscillator 90 having its circuit thus closed to ground, sends a signal current through lead 100, switch contacts 99 and 98, and leads 103 and 101 to signal amplifier 102. The amplified signal energizes relay 104 to close switch 105. This closure of switch 105 acts in turn to connect solenoid 34 across the two power leads, and the resulting energization of the solenoid actuates ratchet wheel 32 to move ahead one step, moving the rotors of switch decks 25, 26 and 27 likewise one step ahead. The switch rotor of deck 25 now connects second lane translating magnets 13 in circuit, while the rotor contact 36 of switch deck 26, now making with one of contacts 37, energizes magnet 80 to actuate motor reverse switch 73 and so reverse the direction of the tape. Thus the result of closure of switch 94 has been to make the control signal record 112, to shift over from first lane magnets 12 to second lane magnets 13, and to reverse the direction of the tape. The time taken to accomplish these operations, before the motor 21 reverses its direction, is preferably of the order of a fraction of a second, for example, a quarter of a second, so that the control signal 112 may be of a length of say three inches on the tape. It may now be understood why the circuit was broken at 98, 99 during the making of the signal record 111, since if the circuit had remained closed from the oscillator 90 to the amplifier 102 during that operation, the magnet 104 would have been energized, and the solenoid 34 improperly energized and cause to change lanes and reverse the drive motor. The switch 98, 99 prevents this occurrence during the starting operation. It will of course be understood that the manual switch 95 will be released and permitted to open the instant the above described switch over to lane 2 has been accomplished.

Instantly after the tape has reversed direction, the recorded control signal 112 passing the translating magnets 20 will generate a signal therein, which will of course be transmitted via lead 84, switch 86 to lead 89, lead 100, switch contacts 99 and 98, and leads 103 and 101 to amplifier 102, and might be thought to improperly actuate the relay 104 at this time. This will not occur, however, for the reason that the tape drive motor will not be able to achieve full speed until the tape has moved several inches, with the result that the generated signal voltage, which will of course be at a frequency of less than the normal 1000 cycles, will not be of sufficient amplitude to effect an operation of the relay 104. It should be noted that the maximum amplitude is obtained from a magnetic tape when the signal frequency is 1000 cycles; and it will be understood that the gain of the amplifier is made sufficiently low with reference to the signal strength reaching its input terminals that a 1000 cycle signal is required to actuate the relay 104. Thus the recorded 1000 cycle signal on the tape will not actuate the relay 104 unless it passes the magnets 20 at substantially full tape speed, which is not achieved from a dead stop within the approximately three inches of tape occupied by the record 112.

Recording thus may proceed on the second lane of the tape, with the tape traveling oppositely to its initial direction. Immediately after the total recording period of 15 minutes has elapsed, the initially recorded control signal 111 will encounter the control magnets 20, and will generate a 1000 cycle signal therein which will be conducted via conductor 84, switch 86, conductors 89 and 100, switch contacts 99 and 98 and conductors 103 and 101 to amplifier 102, whereby magnet 104 closes switch 105 to energize solenoid 34 and so advance the rotors of switch decks 25, 26, 27 one further step ahead. This has the effect of switching to third lane magnets 14, and operating switch 73 to reverse the direction of the tape drive motor. It also has the effect, however, at switch deck 27 and selector switch 63, of stopping the drive motor. Said motor is energized through line 61 connected to collector ring 35 of deck 27 by brush 41, brush 36, one of contacts 37 and the corresponding conductor 62 and stationary selector switch contacts, collector ring 65, brush 68 and lead 69. With the selector switch 63 in the position of Figure 1, this circuit is broken at selector switch contact 2 when the rotor of deck 27 reaches the third position, as it does when solenoid 34 is energized at the end of lane 2 (or at the beginning of lane 3). The tape drive motor thus comes to a stop. The motor switch 72 should however then be opened, so that subsequent actuations of lane selector switch 110 will not result in restarting the motor.

There has thus been produced the "block" recording 11, using however only the first and second lanes 1 and 2. The length of the block, in "time," has been 7½ minutes, and it will be understood that the proportionate length of the tape used might for instance be one-quarter of its full length.

If it should now be desired to reproduce at once the recordings made on lanes 1 and 2, manual switch 110 is closed successively a number of times sufficient to bring the rotors of switch decks 25, 26 and 27 back to the original position of Figure 1, and switches 46 and 86 are shifted to their "reproduce" positions. Translating magnets 12 of the first lane of the tape are now in circuit with speaker 55, the rotor of switch deck 26 is in position for the tape to be driven in its original direction, and the rotor of switch deck 27 is in position for the drive motor to be energized through the "0" position contact of selector switch 63. Motor switch 92 is then closed to start the tape in its original direction, and the record recorded on lane 1 is immediately reproduced. At the end of the "block" 11, i. e., at the end of the recorded length of lane 1, control magnets 20 encounter control signal 112, which generates a 1000 cycle signal. This is fed through switch 86, then in its alternate position, directly to amplifier 102, whose output actuates relay 104, causing switch 105 to close. The latter occurrence of course energizes solenoid 34, thereby actuating ratchet wheel 32 to move the rotors of switch decks 25, 26 and 27 ahead one step. This in turn switches from first lane magnets 12 to second lane magnets 13, reverses the direction of tape drive motor 21, and maintains the motor 21 energized through the selector switch 63. The tape thus travels in its reverse direction, and the recording previously made on lane 2 is reproduced. The time taken for this reversing action will quite evidently be the same as the time interval during which the 1000 cycle signal 112 was recorded on the control lane during the recording operation; namely, about one-quarter of a second. There is no noticeable break in the continuity of reproduction, and in practice, it is impossible by listening to determine that the change-over has been made from lane 1 to lane 2.

Reproduction thus proceeds from the second lane of the tape to the end thereof, at which time the control magnets 20 encounter the control signal 111 on the tape, causing a 1000 cycle control signal to be delivered through switch 86 to amplifier and so on to energize solenoid 63 and actuate the rotors of the switch decks to move one step ahead. As in recording, the motor circuit is now broken at the gap 66 of the selector switch, so the machine stops automatically at the termination of the recording. Motor switch 110 should then be opened.

Assume that it is desired to make a block recording of one hour's duration, with each of the eight lanes taking seven and one-half minutes thereof. In other words, the block is to be of the same length on the tape as before, but the recording is to be spread over all eight lanes, as represented in Figure 4. The selector switch 63 is this time rotated to bring its gap 66 opposite the eighth contact, indicating that the drive motor will stop at the end of lane 8. The recording operation will then be initiated as in the first example, control signals 111 and 112 being made on the tape as before. In this case, however, the selector switch and switch deck 27 do not arrest operation of the machine at the end of lane 2. Control magnets 20 encounter the control signal 111 on lane 9, and a 1000 cycle signal is generated in magnets 20 and delivered by circuit lead 84, switch 86, leads 89 and 100, switch contacts 99 and 98 and leads 103 and 101 to amplifier 102, whereby relay 104 is energized and switch 105 closed to actuate solenoid 34. Accordingly, the switch rotors of decks 25, 26 and 27 will be stepped ahead to their third positions, thereby switching over to third lane translating magnets 14, reversing the direction of the tape drive motor back to its original direction, and preserving the closed motor circuit through switch deck 27 and the selector switch 63 because of the new position of the latter, described just above. This occurrence requires typically about a quarter of a second, so that the second record lane overlaps the control signal 111 on the tape by a distance of perhaps three inches, as indicated in Figure 1. The signal 111 does not cause an actuation of relay 104 at the beginning of the tape movement in the new direction for reasons already made evident. Thus the tape is driven back and forth between the end limits determined by the two control signals 111 and 112 recorded on the tape, and as said signals are encountered at the end portions of the record lanes, a switching operation automatically occurs by which the next succeeding translating magnets are connected in circuit. At the end of lane 8, however, the rotor of switch deck 27 breaks the motor circuit by moving to its ninth position (occupied by the brush 41) wherein it is disconnected from all of the leads 62 leading toward selector switch 63. For this one case, therefore, the drive motor stops simply by virtue of the rotor of switch deck 27 reaching its ninth position, and the only reason for pre-setting the selector switch 63 to the dot-dash position is to preserve the energization of the drive motor until the end of record lane 8 has been reached.

To reproduce the eight lane recording made as just above described, switches 46 and 86 are thrown to their alternate positions, and lane selector switch 110 is actuated once to return the deck switch rotors 25, 26 and 27 to the initial position of Figure 1, which restarts tape drive motor 21 in its original direction, and switches back to first lane magnets 12, whereupon the recordings on the eight lanes of the tape will be reproduced in succession. As the ends of the several lanes are reached, the control magnets 20 encounter the signals 111 or 112, as the case may be, generating signals which actuate the relay 104 to switch to the next pair of translating magnets and to reverse the direction of the tape, in the manner already described. At the end of lane 8, the machine is stopped as in the recording operation.

We have now given two illustrations, one consisting of a two lane recording, and the other of an eight lane recording, within the end limits of a single block, the length of the block being set by the control signals 111 and 112, and the number of lanes used before the machine automatically comes to a stop being determined by the setting of the selector switch 63. It will be evident that the selector switch 63 may be set to stop the machine at the end of any even numbered lane, as 2, 4, 6 or 8, and that in any such case, reproduction may begin at once, without rewinding, on lane 1. On the other hand, the selector switch 63 may obviously also be set to stop the machine at the end of any odd numbered lane, as 1, 3, 5 or 7, though in such a case reproduction from the beginning end of lane 1 cannot begin without rewinding.

It may sometimes occur that, particularly where the precise recording time duration is not known in advance, it will become desirable to go on following the completion of an eight lane recording within the first block 11 and proceed with a second recording within a second block 113, as represented in Figure 6. As one example, if it has been determined at the end of lane 7 that a second block is wanted, the previously described switch 109 may be closed, this switch closure being made a short time prior to the instant when control signal 112 encounters magnets 20. It will be evident that this closure of switch 109 will bypass the signal generated within magnets 20 to ground, so that no signal is in this instance delivered to amplifier 102 for actuation of relay 104. Accordingly, the tape will pass the end limit of the first record block 11, and enter upon a clean section of the tape, whereupon a second block 113, of any desired time duration, may be recorded as represented. It will of course be evident that in this instance, the recording might be continued immediately on lane 7 of the new block, though it may be preferred to actuate the selector switch 110 to return operations to lane 1, as has been indicated in Figure 6. In Figure 6, numerals 114 and 115 designate the new end limit signals recorded on the control signal lane to establish the new block, and it will be understood without further detailed description how operations may be carried on within the second block, or within a third or a fourth, just as previously described in connection with the first block. It will be understood that switch 109 is always available to permit the tape to be driven beyond the end limits of any block, so that the machine may be at any time shifted from any one block to another block. Once, however, the control magnets 20 are between the two end limit control signals of a given block, the tape will not pass in either direction beyond those end limits without operation of the switch 109.

Instead of passing on to the second block from the end of lane 7 of the first block, it would also be possible to complete all eight lanes of the first block before going on to the second; or, operations can be transferred to the second block from either end of any lane of the first block. If for instance it becomes desirable to go on to a second block from the end of block 8, the selector switch 110 may be actuated to return the deck switches to lane 1, and the tape may then be allowed to travel to the opposite end of lane 1, at which time switch 109 is depressed to permit the end limit signal 112 to be passed.

It will be evident that upon passing from one block to the next, it may be necessary to reset the selector switch 63 to permit automatic stopping of the machine at the proper time. For instance, the switch 63 might first be set to stop the machine at the end of lane 7. It might then be desired to pass on to the second block, but to use only lanes 1 and 2 thereof, in which case it would be necessary to properly reset the selector switch 63.

Referring again to Figure 6, it will also be evident that, having finished a recording on for instance all eight lanes of the second "block," the switch 109 might be depressed while the signals 114 and 112 passed the magnets 20, thus permitting recording along previously unused lane 8 of the first block to the end thereof, just as indicated in Figure 6.

It will also be readily understood that for many purposes it may become desirable to record on the full length of the tape rather than within a block or subdivision thereof, and that in such cases end limit control signals recorded on the ninth or control lane of the tape near the two ends thereof may be utilized to advantage for purposes of reversing the tape and shifting from lane to lane. As a matter of fact, we prefer to invariably make use of such end limit signals in any event, even when employing our block system. Thus, as in Figure 7, the tape may have several block recordings, as 11 and 113, with its respective pairs of end limit signals 111, 112 and 114, 115, and it may also have, on lane 9, outside end limit signals 116 and 118. These latter may be placed on the tape at any time, and serve to safeguard against accidentally running the tape off the reels.

The present disclosure has not included various well known expediencies such as the provision of erasing magnets, or of means of reversing the direction of the tape drive motor 21 without shifting from lane to lane (so as to permit backtracking along a given lane). Such provisions are disclosed in the aforementioned prior patents and applications and, since they form no part of the present invention, the present disclosure need not be burdened therewith.

One present embodiment of the invention has now been described in some detail, but is to be understood as being for illustrative purposes only, it being understood that various changes and modifications may be made without departing from the spirit and scope of the invention or of the appended claims.

We claim:

1. In a multiple lane sound recording and reproducing system using a magnetizable record tape, the combination of: reversible tape drive means for driving a record tape in reverse directions, translating electromagnet means for successively making recordings in reverse directions on a plurality of transversely spaced longitudinally extending record lanes of the tape, control signal electromagnet means cooperable with a signal lane extending longitudinally of the tape, a signal generator, a control circuit connecting said signal generator to said signal electromagnet means, said control circuit being operable to effect recording of and limit signals at selected localities along said signal lane, and means operable by signals generated in said control signal electromagnet means by said recorded end limit signals to reverse said tape drive means.

2. In a system for making multiple lane recordings on a record tape, the combination of: reversible tape drive means for driving a record tape in reverse directions, translating electromagnet means for successively making recordings in reverse directions on a plurality of transversely spaced longitudinally extending record lanes of the tape, lane selector means operable step-by-step to render said translating electromagnet means effective with members of said plurality of lanes in predetermined succession, a control signal electromagnet means cooperable with a signal lane extending longitudinally of the tape, a signal generator, an electric circuit including switch means operable for connecting said signal generator to said control signal electromagnet means, whereby an end limit recording can be made on said signal lane, and switch controlled means energized by said operation of said switch means to reverse the direction of said reversible tape drive means and to operate said lane selector means.

3. In a system for making multiple lane recordings on a record tape, the combination of: reversible tape drive means for driving a record tape in reverse directions, translating electromagnet means for successively making recordings in reverse directions on a plurality of transversely spaced longitudinally extending record lanes of the tape, lane selector means operable step-by-step to render said translating electromagnet means effective with members of said plurality of lanes in predetermined succession, a control signal electromagnet means cooperable with a signal lane extending longitudinally of the tape, a signal generator, and an electric circuit including switch means operable for connecting said signal generator to said control signal electromagnet means, whereby an end limit recording can be made on said signal lane, and means energized by said operation of said switch means to operate said lane selector means.

4. In a system for making multiple lane recordings on a record tape, the combination of: reversible tape drive means for driving a record tape in reverse directions, translating electromagnet means for successively making recordings in reverse directions on a plurality of transversely spaced longitudinally extending record lanes of the tape, lane selector means operable step-by-step to render said translating electromagnet means effective with members of said plurality of lanes in predetermined succession, a control signal electromagnet means cooperable with a signal lane extending longitudinally of the tape, a signal generator, and an electric circuit including switch means operable for connecting said signal generator to said control signal electromagnet means, whereby an end limit recording can be made on said signal lane, and means energized by said operation of said switch means to operate said lane selector means, said electric circuit also including switch means operable to connect said signal generator to said control signal electromagnet means without energizing said switch controlled means.

5. In a system for making multiple lane recordings on a record tape, the combination of: reversible tape drive means for driving a record tape in reverse directions, translating electromagnet means for successively making recordings in reverse directions on a plurality of transversely spaced longitudinally extending record lanes of the tape, lane selector means operable step-by-step to render said translating electromagnet means effective with members of said plurality of lanes in predetermined succession, a control signal electromagnet means cooperable with a signal lane extending longitudinally of the tape, a signal generator, and an electric circuit for connecting said signal generator to said control signal electromagnet means, said electric circuit including switch means operable to connect said signal generator to said control signal electromagnet, whereby an end limit recording is made on said signal lane, means energized by said operation of said switch means to operate said lane selector means, said electric circuit also including switch means operable to connect said signal generator to said control signal electromagnet means without energizing said switch controlled means, and a selector switch and circuit for arresting operation of said tape drive means upon a pre-selected operation of said lane selector means.

HERMAN S. HELLER.
WILLARD E. STOFER.

REFERENCES CITED

The following references are of record in the file of this patent:

UNITED STATES PATENTS

| Number | Name | Date |
|---|---|---|
| 2,031,605 | Jenkins | Feb. 25, 1936 |
| 2,038,976 | Wood | Apr. 28, 1936 |
| 2,110,090 | Ligh | Mar. 1, 1938 |
| 2,172,779 | Von Mihaly | Sept. 12, 1939 |
| 2,225,323 | Severy | Dec. 17, 1940 |
| 2,248,293 | Woolf | July 8, 1941 |
| 2,396,409 | Berzer | Mar. 12, 1946 |
| 2,422,143 | Somers | June 10, 1947 |

FOREIGN PATENTS

| Number | Country | Date |
|---|---|---|
| 297,327 | Great Britain | Dec. 17, 1929 |